United States Patent [19]

Takefuta et al.

[11] 4,273,226
[45] Jun. 16, 1981

[54] ELECTROMAGNETIC SPRING-WOUND CLUTCH

[75] Inventors: Hideyasu Takefuta; Akira Shinoda; Teruyoshi Shibauta, all of Higashimatsuyama, Japan

[73] Assignee: Diesel Kiki Co., Ltd., Tokyo, Japan

[21] Appl. No.: 46,751

[22] Filed: Jun. 8, 1979

[30] Foreign Application Priority Data

Jun. 12, 1978 [JP] Japan .................................. 53-79197

[51] Int. Cl.³ ...................... F16D 13/62; F16D 27/10; F16D 27/14
[52] U.S. Cl. .................................... 192/35; 192/84 T
[58] Field of Search ............... 192/35, 36, 82 T, 84 C, 192/81 C, 106.1

[56] References Cited

U.S. PATENT DOCUMENTS

| | | | |
|---|---|---|---|
| 2,912,963 | 11/1959 | Dufresne | 192/82 T |
| 3,565,223 | 2/1971 | Pierce | 192/106.1 X |
| 3,685,622 | 8/1972 | Baer et al. | 192/84 T |
| 3,735,847 | 5/1973 | Brucken | 192/84 T X |
| 4,194,607 | 3/1980 | Yamaguchi | 192/84 T |

*Primary Examiner*—Rodney H. Bonck

*Attorney, Agent, or Firm*—David G. Alexander

[57] ABSTRACT

Input and output member (21), (28) and a clutch disc (32) are coaxially rotatable relative to each other, the clutch disc (32) being frictionally engageable with the input member (21). A coil-wound spring (33) is wound around the input member (21) and connected at its ends to the clutch disc (32) and output member (28). An electromagnetic coil (26) may be energized to attract the clutch disc (32) into frictional engagement with the input member (21), causing the coil-wound spring (33) to tightly wind around the input member (21) and drivably connect the input member (21) to the output member (28). A generally tubular cover (34) surrounds the coil-wound spring (33), the spring means (40) moving the clutch disc (32) toward engagement with the cover (34) when the coil (26) is de-energized. A resilient, nonmagnetic spacer (51) is fixed to the clutch disc (32) between the clutch disc (32) and the cover (34) which serves the dual function of absorbing vibration and preventing ohmic engagement of the clutch disc (32) with the cover (34) which would cause leakage of magnetic flux and failure of the coil (26) to engage the clutch (11) when the clutch disc (32) becomes worn.

3 Claims, 6 Drawing Figures

ELECTROMAGNETIC SPRING-WOUND CLUTCH

BACKGROUND OF THE INVENTION

The present invention relates to an improved electromagnetic spring-wound clutch which may be advantageously employed to connect an air conditioning compressor to an engine of an automotive vehicle. This invention constitutes a novel and advantageous improvement to an ELECTROMAGNETIC SPRING-WOUND CLUTCH disclosed in copending U.S. patent application Ser. No. 866,645, filed Jan. 3, 1978, now U.S. Pat. No. 4,194,607, issued Mar. 25, 1980, which is assigned to the same assignee as this application.

An electromagnetic spring-wound clutch of the general type to which the present invention relates is disclosed in U.S. Pat. No. 3,735,847 and comprises coaxial input and output members. A clutch disc is rotatably provided on the input member. Furthermore, a coil-wound spring is wound around the input member and connected at its opposite ends to the clutch disc and output member. An electromagnetic coil attracts the clutch disc into frictional engagement with the input member, causing the coil-wound spring to be tightly wound on the input member and drivably connect the input member to the output member. When the coil is de-energized, the clutch disc disengages from the input member, and the coil-wound spring releases the input member for rotation relative to the output member.

The clutch further comprises a generally tubular cover which protectively surrounds the coil-wound spring. With the coil de-energized, the coil-wound spring radially expands due to its own force into engagement with the inner surface of the cover. Furthermore, a spring means urges the clutch disc away from the input member and into engagement with the cover when the coil is de-energized.

Several problems have become evident in this design which are overcome by the present invention. One problem is that the clutch disc, when disengaged, has a tendency to vibrate against the cover during operation of the vehicle and produce undesirable noise. The clutch disc and/or cover may even become deformed through constant vibration after prolonged use of the clutch.

Another and even more serious problem is magnetic flux leakage when the clutch disc and coil-wound spring ohmically engage the cover. Since all of these components are made of iron or steel, they constitute an integral ferromagnetic mass when ohmically engaged. The magnetic flux from the coil permeates not only the clutch disc but also the cover and coil-wound spring. Thus, the magnetic flux density in the clutch disc which is designed to attract the clutch disc to the input member is greatly reduced. It may be considered that the magnetic flux leaks from the clutch disc to the cover and coil wound spring, thereby reducing the magnetic attractive force between the coil and the clutch disc.

In order to overcome the reduced attractive force, an electromagnetic coil which produces an unnecessarily high magnetic field must be provided. Thus, the coil must be disproportionately large in size and dissipate excessive electrical current.

However, the most serious problem is that the clutch may completely fail to engage after prolonged use. Friction between the clutch disc and input member causes the clutch disc to progressively become thinner. As a result, the proportion of magnetic flux in the clutch disc becomes progressively smaller. After the clutch disc becomes so thin that the magnetic flux therein is insufficient to strongly hold the clutch disc against the input member, the clutch will no longer effectively engage and drivably connect the compressor to the engine.

SUMMARY OF THE INVENTION

An electromagnetic spring-wound clutch comprises a rotary input member, a rotary output member coaxial with the input member and a rotary clutch disc coaxial with the input member and being frictionally engageable therewith. A coil-wound spring wound around the input member is connected at its ends to the clutch disc and the output member respectively. A cover member fixed to the output member covers the coil-wound spring. Spring means urge the clutch disc away from engagement with the input member and toward engagement with the cover member. An electromagnetic coil which, when energized, attracts the clutch disc into frictional engagement with the input member against a force of the spring means. A non-magnetic, resilient spacer is fixed to the clutch disc between the clutch disc and the cover member.

It is an object of the present invention to prevent vibration of a clutch disc in an electromagnetic spring-wound clutch.

It is another object of the present invention to provide an electromagnetic spring-wound clutch comprising an electromagnetic coil which is smaller and dissipates less electrical current than comparable coils in prior art clutches.

It is another object of the present invention to provide an electromagnetic spring-wound clutch which reliably engages even after prolonged use and frictional attrition of a clutch disc thereof.

It is another object of the present invention to eliminate a cause of undesirable magnetic flux leakage in an electromagnetic spring-wound clutch.

It is another object of the present invention to provide a generally improved electromagnetic spring-wound clutch.

Other objects, together with the foregoing, are attained in the embodiments described in the following description and illustrated in the accompanying drawing.

DESCRIPTION OF THE PREFERRED EMBODIMENTS

While the electromagnetic spring-wound clutch of the present invention is susceptible of numerous physical embodiments, depending upon the environment and requirements of use, substantial numbers of the herein shown and described embodiments have been made, tested and used, and all have performed in an eminently satisfactory manner.

Figure 1:
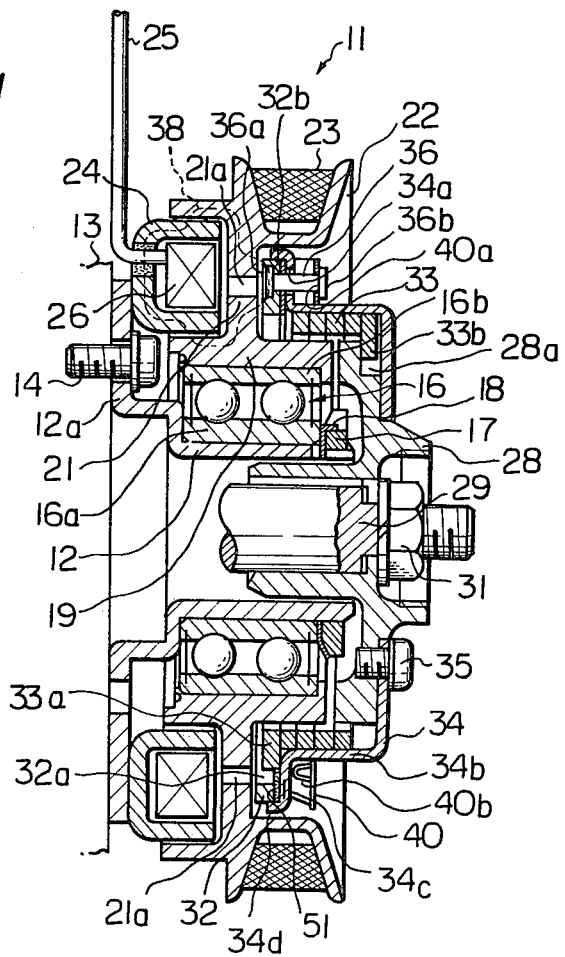
FIG. 1 is a longitudinal sectional view of an electromagnetic spring-wound clutch embodying the present invention.

Referring now to FIG. 1 of the drawing, an electromagnetic spring-wound clutch embodying the present invention is generally designated as 11 and comprises a tubular hub 12 which is rigidly mounted to a compressor 13 of an air conditioning system for an automotive vehicle (not shown) by means of a flange 12a of the hub 12 and bolts 14. An inner race 16a of a ball bearing 16 is fitted over the hub 12 and is rigidly held in place by means of a nut 17 screwed onto a threaded right end portion of the hub 12 and an intervening lock washer 18. A tubular input member 19 is tightly fit onto an outer race 16b of the bearing 16 and rigidly held in place by means of a reduced diameter right shoulder and a left end of the input member 19, the latter being crimped over the left end of the outer race 16b. An annular member 21 having a hollow cross-section is integral with the input member 19. The left wall of the annular member 21 is cut away, and a plurality of circumferentially spaced, arcuate slots 21a are formed through the right wall of the annular member 21. A pulley 22 is integral with the annular member 21 and connected to an engine of the automotive vehicle (not shown) through a V-belt 23.

Another annular member 24 is welded to the flange 12a of the hub 12 and fits inside the hollow of the annular member 21 without touching the same. The right wall of the annular member 24 is cut away. Rigidly mounted inside the annular member 24 is an electromagnetic coil 26 which may be energized through a lead 25.

A generally tubular output member 28 is rotatably supported inside the hub 12. An output shaft 29 is threaded at its right end and rigidly fixed to the output member 28 by means of a nut 31 and conjugate shoulders of the shaft 29 and output member 28. The output shaft 29 is constituted by a drive shaft of the compressor 13, although the connection is not shown in detail.

An annular clutch disc 32 is rotatably provided around the input member 19. A coil-wound spring 33 is wound around the input member 19 in such a manner as to be radially spaced from the input member 19 in its free state. One end of the spring 33 is connected to the clutch disc 32 by means of a radially outwardly extending tab 33a of the spring 33 which fits in a slot 32a formed in the inner circumference of the clutch disc 32. The other end of the spring 33 is connected to the output member 28 by means of a radially inwardly extending tab 33b of the spring 33 which fits in a slot 28a formed in the outer circumference of the output member 28. The clutch 11 further comprises a cover 34 which is firmly attached to the output member 28 by bolts 35. The cover 34 encloses the coil-wound spring 33 and extends partially around the clutch disc 32.

A plurality (3 or more) of arcuate slots 34a are formed through the outer portion of the cover 34 which faces the clutch disc 32, although only one slot 34a is visible in the drawing. A pin 36 having left and right heads 36a and 36b respectively slidably extends through each slot 34a, the diameter of the pin 36 being substantially the same as that of the slot 34a. Conjugate to the slots 34a, circumferential spaced holes 32b are formed through the clutch disc 32. Each hole 32b comprises a small portion having a width equal to the diameter of the pin 36 and a large portion having a width greater than a diameter of the left head 36a of the pin 36. A generally annular spring 40 is formed with holes 40a through which the pins 36 extend. The spring 40 is fitted over the cover 34 as shown. The spring 40 is made of spring steel and provided by press forming or the like with resilient axial projections 40b which engage the cover 34 in a resiliently deformed state and urge the pins 36 and thereby the clutch disc 32 rightwardly. In this state, the clutch disc 32 is spaced from the annular member 21. The clutch disc 32 is supported by the pins 36 and guided thereby for axial movement in parallelism with the annular member 21.

The integral input member 19, annular member 21 and pulley 22 are mutually coaxial and are driven by the V-belt 23. The output member 28, output shaft 29 and cover 34 are also mutually coaxial and rotate as a unit.

With the coil 26 de-energized, the spring 40 urges the clutch disc 32 out of engagement with the annular member 21 and toward engagement with the cover 34. The coil-wound spring 33 radially expands so as to be clear of the input member 19. The annular member 21 rotates relative to the clutch disc 32, which remains stationary. There is no driving connection between the pulley 22 and output shaft 29, and the output shaft 29 remains stationary.

To engage the clutch 11 and drive the compressor 13 from the pulley 22 by means of the output shaft 29, the coil 26 is energized with electric current. A magnetic circuit is established from the coil 26 through the slots 21a of the annular member 21 and the clutch disc 32 indicated by a phantom line curve 38 in FIG. 1. This attracts the clutch disc 32 leftwardly into frictional engagement with the annular member 21 against the force of the spring 40. The clutch disc 32 rotates with the annular member 21, winding the coil-wound spring 33 tightly around the input member 19. Due to the provision of the tabs 33a and 33b and slots 32a and 28a, the output member 28 is drivingly connected to the input member 19 through the clutch disc 32 and spring 33. The pulley 22, output shaft 29 and intervening components rotate as a unit, driving the compressor 13 from the engine. The rotational movement of the clutch disc 32 relative to the cover 34 necessary for winding the coil-wound spring 33 around the input member 19 is made possible by the slots 34a in the cover 34.

To disengage the clutch 11, the coil 26 is de-energized, thereby removing the magnetic attractive force from the clutch disc 32. The spring 40 immediately and smoothly moves the clutch disc 32 away from the annular member 21 and toward abutting engagement with the cover 34.

It will be noted that the clutch disc 32 is maintained parallel to the annular member 21 by the pins 36, and thereby engages and disengages the annular member 21 in a completely smooth manner.

Although only one coil-wound spring 33 is shown and illustrated, it will be understood by those skilled in the art that two intertwined coil-wound springs may be provided.

Figure 2:
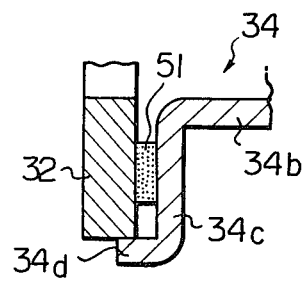
FIG. 2 is an enlarged sectional view of a first embodiment of a spacer and related components of the present clutch.

As best seen in FIG. 2, the cover member 34 comprises an axial portion 34b which protectively encloses the coil-wound spring 33, a radial portion 34c toward which the clutch disc 32 is urged by the spring 40 and an axial portion 34d which extends from the radial periphery of the radial portion 34c to partially enclose the clutch disc 32. In accordance with an important feature of the present invention, an annular, resilient, non-magnetic spacer 51 is fixed to a surface of the clutch disc 32 facing the radial portion 34c of the cover member 34. With the coil 26 de-energized the clutch disc 32 is moved by the spring 40 into abutting engagement with the radial portion 34c of the cover member 34 through the spacer 51 as shown in FIG. 2 and is thereby prevented from directly ohmically engaging the radial portion 34c of the cover 34.

Figure 4:
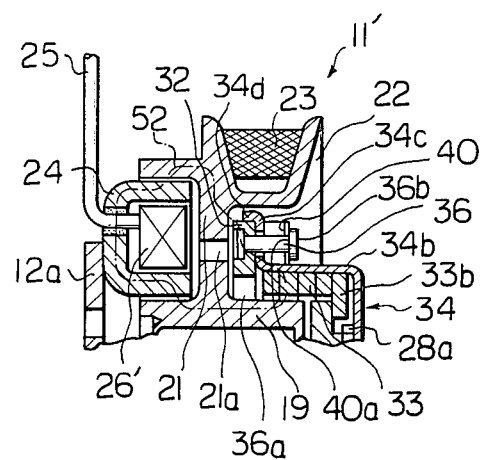
FIG. 4 is a fragmentary sectional view illustrating a problem in the prior art which has heretofore remained unsolved.

FIG. 4 illustrates the case of the prior art in which a spring-wound clutch is designated as 11' and like elements are designated by the same reference numerals used in FIG. 1. The clutch 11' differs from the clutch 11 in that the spacer 51 is not provided and the clutch disc 32 ohmically engages with the radial portion 34c of the cover 34 when a coil 26' is de-energized. It will also be seen that the coil-wound spring 33 expands due to its own force and ohmically engages the axial portion 34b of the cover 34.

Figure 6:
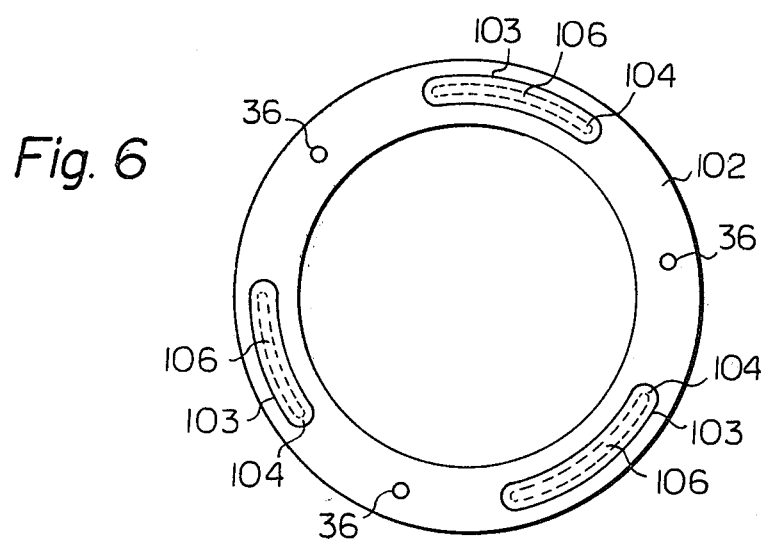
FIG. 6 is a plan view of a fourth embodiment of the spacer.

The magnetic flux circuit in the clutch 11' with the coil 26' energized is illustrated by means of a phantom line curve 52 in FIG. 6. It will be seen that the circuit 52 permeates not only the clutch disc 32 but also the coil-wound spring 33 and cover 34 since they are in ohmic engagement. With the magnetic flux distributed through so many ferromagnetic components, the flux density in the clutch disc 32 is comparatively small. For this reason, the magnetic field of the coil 26' must be excessively strong to attract the clutch disc 32 strongly to the annular member 21 for engagement of the clutch 11'. Also, as described hereinabove, as the clutch disc 32 wears thin due to frictional attrition over a prolonged period of use, the proportion of flux in the clutch disc 32 will become so small that the coil 26' can no longer attract the clutch disc 32 to the annular member 21 with sufficient force to engage the clutch 11'.

The present spacer 51 completely overcomes this problem by effectively preventing the magnetic flux of the coil 26 from permeating the cover member 34 and coil-wound spring 33. Thus, practically all of the flux of the coil 26 is available for attracting the clutch disc 32 to the annular member 21. It will be noted that the spacer 51 prevents the clutch disc 32 from ohmically engaging the cover member 34. This makes it possible to replace the coil 26' of the clutch 11' with a smaller coil 26 in the clutch 11, although the difference in size is not illustrated. Also, it is possible to reduce the electrical current flow through the coil 26 as compared to the coil 26'.

Most importantly, the clutch 11 is positively prevented from failing to engage due to wear of the clutch disc 32 since such wear does not have any effect on the magnetic flux distribution in the clutch 11.

The spacer 51 may be formed of any known suitable resilient material such as rubber or plastic, and may be adhered to the surface of the clutch disc 32 facing the radial portion 34c of the cover member 34 by an adhesive. Alternatively, the spacer 51 may be heated and fused to the clutch disc 32.

In addition to preventing magnetic flux leakage, the spacer 51 also serves to absorb vibration between the clutch disc 32 and the radial portion 34c of the cover member 34. This positively prevents undesirable noise and damage to the clutch disc 32 and cover 34.

Figure 3:
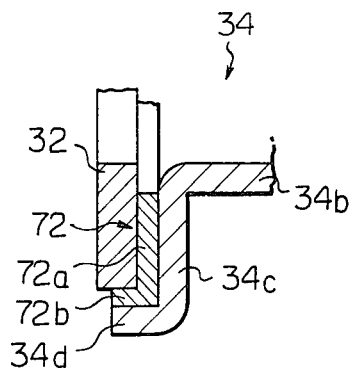
FIG. 3 is similar to FIG. 2 but shows a second embodiment of the spacer.

FIG. 3 shows another spacer 72 embodying the present invention. In addition to comprising a radial portion 72a fixed to the surface of the clutch disc 32 facing the radial portion 34c of the cover member 34, the spacer 72 further comprises an axial portion 72b fixed to another surface of the clutch disc 32 facing the inner surface of the axial portion 34d of the cover member 34. The axial portion 72b positively prevents the outer edge of the clutch disc 32 from contacting the inner surface of the axial portion 34d of the cover member 34.

Figure 5:
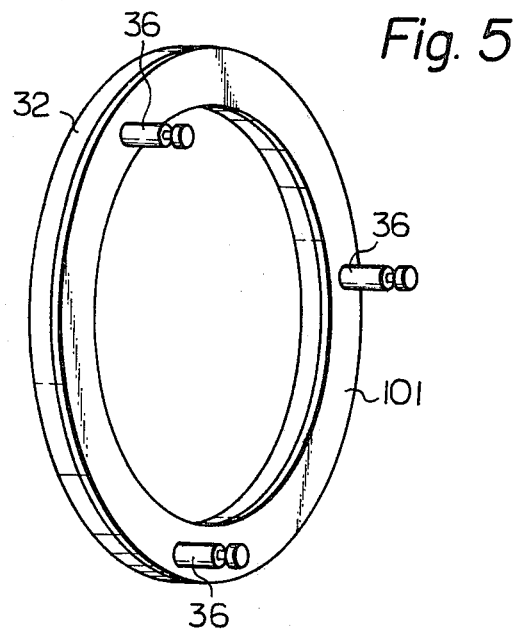
FIG. 5 is a perspective view of a third embodiment of the spacer.

FIG. 5 illustrates another embodiment of the present invention in which a resilient and non-magnetic spacer 101 made of rubber or the like is adhered to the clutch disc 32. The spacer 101 serves the same function as the spacers described hereinabove. The shape of the spacer 101 is substantially coextensive with the surface of the clutch disc 32 which faces the cover 34. The spacer 101 is adhered to the clutch disc 32 by an adhesive or by fusing.

FIG. 6 illustrates another arrangement in which the surface of a clutch disc 102 which faces the cover 34 is formed with a plurality of circumferentially spaced grooves 103. The spacer in this embodiment is constituted by a plurality of spacer sections 104 which are fittingly retained in the grooves 103 respectively. The section 104 extend above the surface of the clutch disc 102 which faces the cover 34 so that the sections 104 abut against the cover 34 and thereby prevent abutment of the clutch disc 102 with the cover 34.

In order to facilitate establishment of a magnetic circuit for attracting the clutch disc 102 to the annular member 21, holes 106 are formed through the bottom walls of the grooves 103. The holes 106 are smaller than the grooves 103 so that the spacer sections 104 are able to seat on the bottom wall portions of the grooves 103 which surround the holes 106.

In summary, it will be seen that the present spring-wound clutch overcomes the problems of the prior art by preventing vibration of a clutch disc and magnetic flux leakage through various other components thereof which hamper engagement of the clutch. Various modifications will become possible for those skilled in the art after receiving the teachings of the present disclosure without departing from the scope thereof.

What is claimed is:

1. An electromagnetic spring-wound clutch comprising:
   a rotary input member;
   a rotary output member coaxial with the input member;
   a rotary clutch disc coaxial with the input member and frictionally engageable therewith;
   a coil-wound spring wound around the input member and being connected at its ends to the clutch disc and the output member respectively;
   a cover member fixed to the output member and covering the coil-wound spring;
   spring means urging the clutch disc away from engagement with the input member and toward engagement with the cover member;
   an electromagnetic coil which, when energized, attracts the clutch disc into frictional engagement with the input member against a force of the spring means; and
   a non-magnetic, resilient spacer disposed between the clutch disc and the cover member;
   a surface of the clutch disc facing the cover member being formed with a plurality of circumferentially spaced grooves, the spacer comprising a plurality of spacer sections fittingly retained in the grooves respectively.

2. A clutch as in claim 1, in which the clutch disc is further formed with a plurality of holes which extend through bottom walls of the grooves respectively, the holes being smaller than the grooves.

3. A clutch as in claim 2, in which the clutch disc is axially movable in opposite directions toward engagement with the input member and cover member respectively, the spacer abutting against the cover member and thereby preventing the clutch disc from directly engaging with the cover member.

* * * * *